A. W. McKOWN.
Improvement in Springs for Vehicles.
No. 124,756. Patented March 19, 1872.
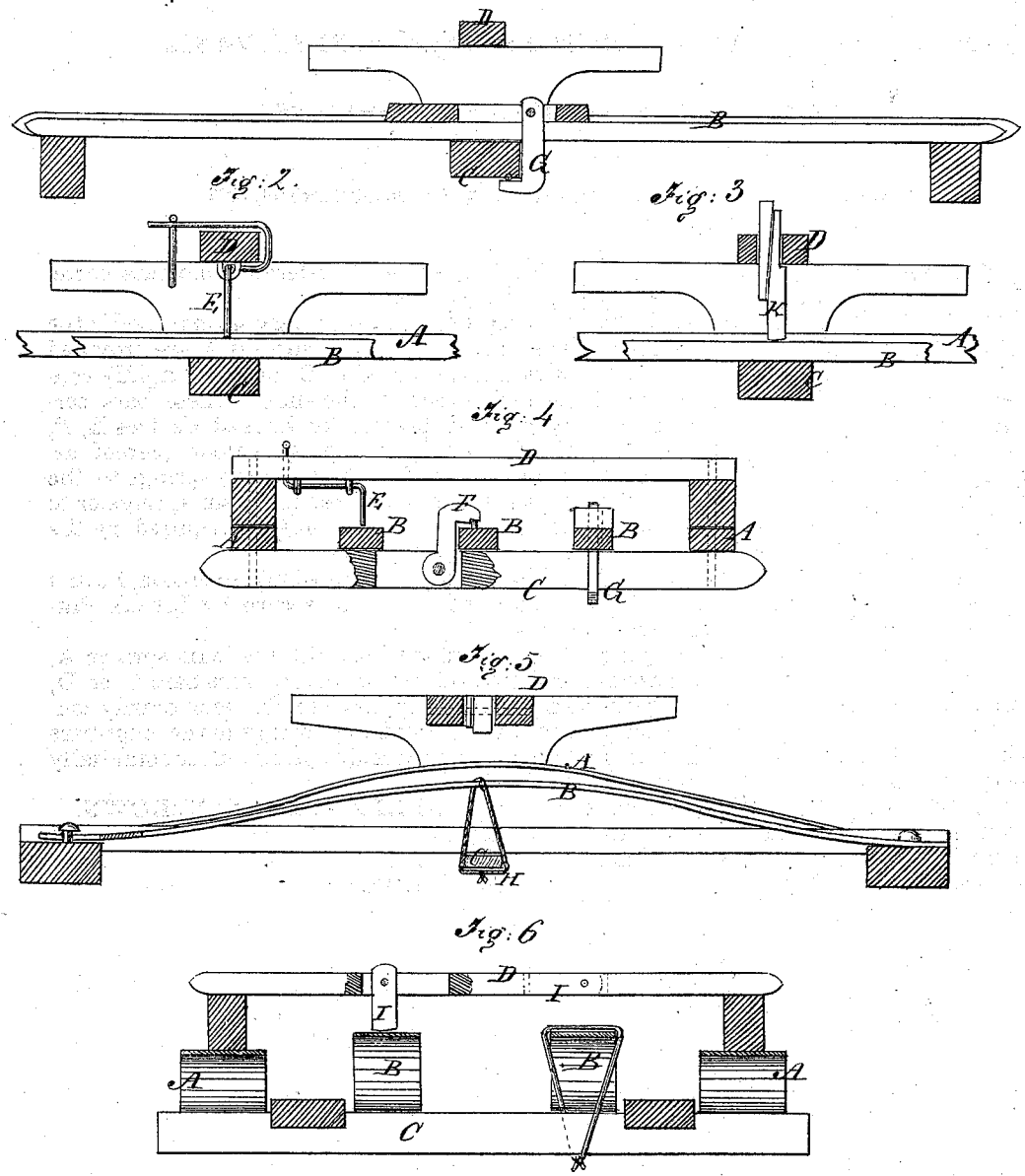

124,756

UNITED STATES PATENT OFFICE.

ALEXANDER W. McKOWN, OF HONESDALE, PENNSYLVANIA.

IMPROVEMENT IN SPRINGS FOR VEHICLES.

Specification forming part of Letters Patent No. 124,756, dated March 19, 1872.

Specification describing a new and useful Improvement in Wagon-Springs, invented by ALEXANDER W. McKOWN, of Honesdale, in the county of Wayne and State of Pennsylvania.

My invention consists of the combination of auxiliary springs with the ordinary springs of a wagon and connecting devices, whereby the said auxiliary springs may be utilized to reinforce the ordinary springs according to the weight of the load, and thus avoid the present objectionable practice of using the same springs for light or heavy loads, for both of which they cannot be well adapted.

Figure 1 is a longitudinal section of a set of wood springs, showing one mode of carrying out my invention. Figs. 2 and 3 are partial longitudinal sectional elevations, showing different means for connecting the auxiliary springs with the principal ones. Fig. 4 is a transverse section, also showing different modes of connecting the said springs. Fig. 5 is a longitudinal section of metal carriage-springs, arranged according to my improvement, and Fig. 6 is a cross-section of Fig. 5.

Similar letters of reference indicate corresponding parts.

A represents the ordinary springs, and B the auxiliaries. The said springs A are provided with a cross-bar, C or D, or both, rigidly connected to them at the ends. These bars carry cranked, pivoted, or hooked devices E, F, G, H, I, or K, or any equivalent thereof, arranged to confine the auxiliary springs to the cross-bars to re-enforce the main springs or to disconnect them, as may be required by the conditions of the load.

Having thus described my invention, I claim as new and desire to secure by Letters Patent—

The combination, with the main springs A, of the auxiliary springs B, cross-bars C or D, and connecting devices for temporarily connecting said auxiliary springs to the cross-bars to re-enforce the main springs, all substantially as specified.

ALEXANDER W. McKOWN.

Witnesses:
 F. KIPLE,
 R. W. KIPLE.